United States Patent
Iwashita et al.

(10) Patent No.: US 6,660,674 B2
(45) Date of Patent: Dec. 9, 2003

(54) DIELECTRIC CERAMIC COMPOSITION FOR HIGH FREQUENCY WAVE

(75) Inventors: Kazuki Iwashita, Yamaguchi (JP); Koichi Fukuda, Yamaguchi (JP)

(73) Assignee: Ube Electronics, Ltd., Yamaguchi (JP)

( * ) Notice: Subject to any disclaimer, the term of this patent is extended or adjusted under 35 U.S.C. 154(b) by 187 days.

(21) Appl. No.: 10/011,380

(22) Filed: Oct. 22, 2001

(65) Prior Publication Data

US 2002/0072463 A1 Jun. 13, 2002

(30) Foreign Application Priority Data

Oct. 25, 2000 (JP) ........................ 2000-325272

(51) Int. Cl.$^7$ .......................... C04B 35/10; C04B 35/44
(52) U.S. Cl. ........................................ 501/134
(58) Field of Search ........................... 501/134

(56) References Cited

U.S. PATENT DOCUMENTS

| | | | |
|---|---|---|---|
| 4,866,016 A | 9/1989 | Ando et al. | |
| 5,132,258 A | * 7/1992 | Takahashi et al. | .......... 501/134 |
| 5,432,135 A | 7/1995 | Hirahara et al. | |

FOREIGN PATENT DOCUMENTS

| | | |
|---|---|---|
| JP | 62-119157 | 5/1987 |
| JP | 63-76206 | 4/1988 |
| JP | 6-236708 | 8/1994 |
| JP | 9-52760 | 2/1997 |

* cited by examiner

Primary Examiner—David Brunsman
(74) Attorney, Agent, or Firm—Anderson Kill & Olick, P.C.; Eugene Lieberstein; Michael N. Meller

(57) ABSTRACT

A dielectric ceramic composition for high frequency wave having a composition comprising Al, Zr, Ti, Sn and O as a basic composition and represented by compositional formula:

$$aAl_2O_3\text{-}bZrO_2\text{-}cTiO_2\text{-}dSnO_2$$

(in which $0.4068<a<0.9550$, $0<b<0.1483$, $0.0225<c<0.3263$, $0.0203<d<0.1186$, $a+b+c+d=1$).

4 Claims, 1 Drawing Sheet

DIELECTRIC CERAMIC COMPOSITION FOR HIGH FREQUENCY WAVE

BACKGROUND OF THE INVENTION

1. Field of the Invention

This invention relates to a dielectric ceramic composition for high frequency wave having a specific dielectric constant $\epsilon_r$ of 10 to 20, and less dielectric loss tan δ in a high frequency wave region, and capable of easily controlling temperature coefficient $\tau_f$ at the resonant frequency ($f_0$)

2. Description of the Related Art

With the rapid progress of communication networks in recent years, frequencies used for communication have been extended and reached high frequency wave regions such as microwave regions or milli-wave regions. The size of the microwave circuits or milli-wave circuits can be miniaturized as a specific dielectric constant $\epsilon_r$ is larger. However, if the specific dielectric constant $\epsilon_r$ is excessively large, the fabrication accuracy is lowered regarding the high frequency region higher than the microwave region. Therefore, materials having relatively small specific dielectric constant $\epsilon_r$ are necessary.

As the dielectric ceramic composition of this type, for example, BaO—MgO—WO₃ series materials (Japanese Patent Laid-Open No. 236708/1994) and Al₂O₃—TiO₂—Ta₂O₅ series material (Japanese Patent Laid-Open 52760/1997) have been proposed. However, they are not yet sufficient regarding the characteristics as the high frequency wave use and, a dielectric ceramic composition having further excellent characteristics has been demanded. Furthermore, from the point of mass production, less scattering of the characteristic against firing temperature fluctuation is requested.

Meanwhile, alumina (Al₂O₃) exhibits satisfactory dielectric characteristics having a specific dielectric constant $\epsilon_r$ of 9.8 and tan δ of 3 to 5×10⁻⁵ at a measuring frequency of 10 GHz but since the temperature coefficient $\tau_f$ at the resonance frequency ($f_0$) is −55 ppm/° C., the application use is restricted. Further, the firing temperature of Al₂O₃ is as high as 1600° C. or higher to result in a problem that the cost for the firing step is increased.

SUMMARY OF THE INVENTION

This invention intends to eliminate the problems described above and provide a dielectric ceramic composition for high frequency wave having a specific dielectric constant $\epsilon_r$ of 10 to 20 and dielectric loss less tan δ, which is less scattering, and the absolute value of a temperature coefficient $\tau_f$ at the resonance frequency ($f_0$) of 30 ppm/° C. or less, which can easily be controlled.

This invention relates to a dielectric ceramic composition for high frequency wave having a composition comprising, Al, Zr, Ti, Sn, and O as a basic component and represented by the compositional formula:

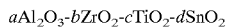

(in which 0.4068<a<0.9550, 0<b<0.1483, 0.0225<c<0.3263, 0.0203<d<0.1186, a+b+c+d=1).

This invention can provide a dielectric ceramic composition for high frequency wave having a specific dielectric constant $\epsilon_r$ of 10 to 20 and less dielectric loss tan δ in a high frequency wave region, which is less scattering against firing temperature fluctuation, and capable of easily controlling a temperature coefficient $\tau_f$ at the resonant frequency ($f_0$).

DETAILED DESCRIPTION OF THE INVENTION

Figure 1:
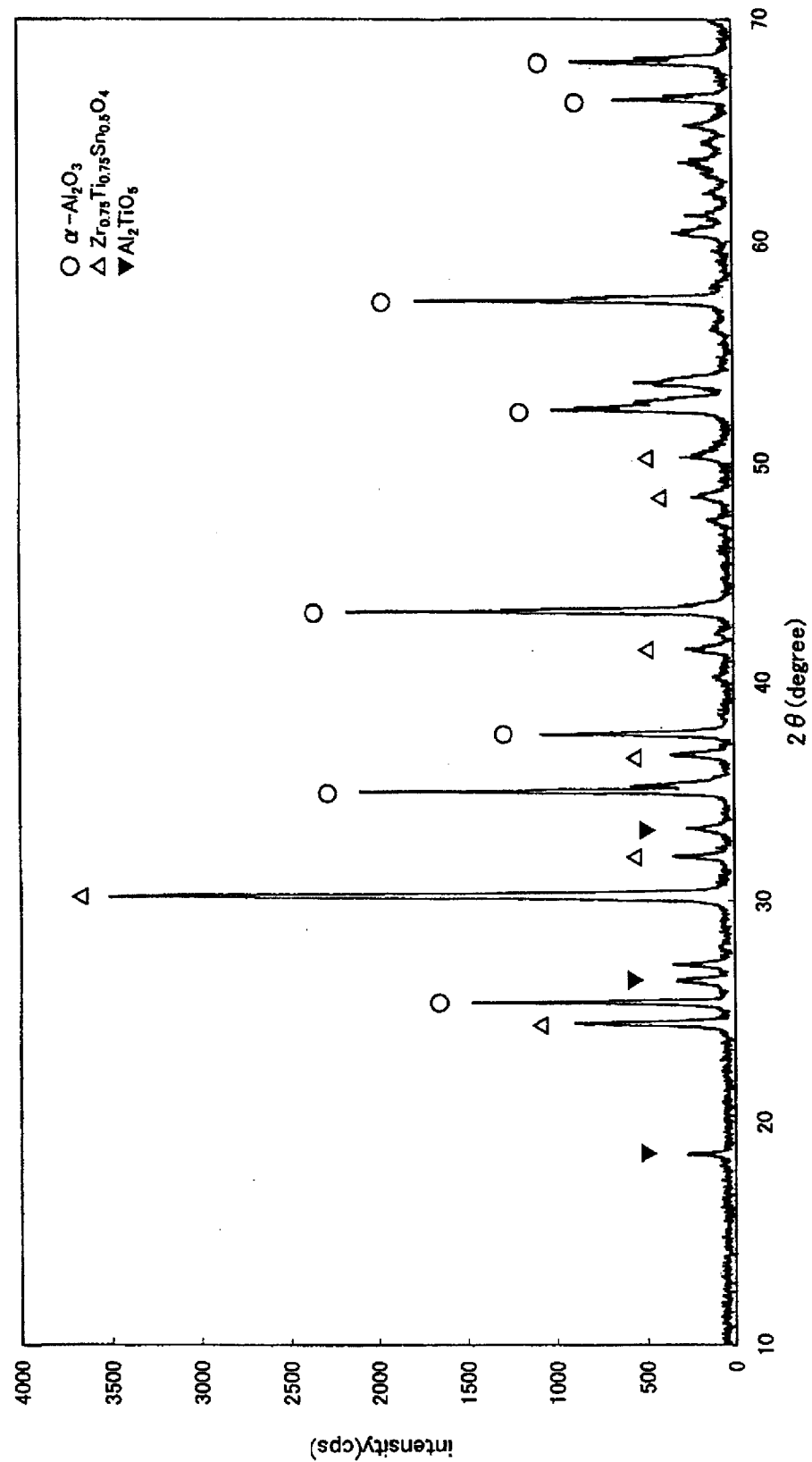
FIG. 1 is an X-ray diffraction chart for a dielectric ceramic composition according to this invention.

The grounds for limitations imposed on the composition of this invention will be explained. In the dielectric ceramic composition for high frequency wave having a composition comprising aluminum, zirconium, titanium, tin and oxygen as a basic component and represented by the compositional formula:

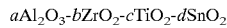

when a is 0.4068 or less, tan δ of the dielectric body increases and, on the contrary, when it is 0.9550 or more, the absolute value for the temperature coefficient $\tau_f$ at the resonance frequency $f_0$ exceeds 30 ppm/° C. which is not preferred. Further, incorporation of Zr decreases tan δ and decreases scattering of the characteristic tan δ against firing temperature fluctuation. However, if b is 0.1483 or more, tan δ increases undesirably. Further, when c is 0.0225 or less, the absolute value for the temperature coefficient $\tau_f$ at the resonance frequency $f_0$ exceeds 30 ppm/° C. and, on the other hand, when it is 0.3263 or more, tan δ increases remarkably which is not preferred. Further, when d is 0.0203 or less, the absolute value for the temperature coefficient $\tau_f$ at the resonance frequency $f_0$ exceeds 30 ppm/° C. and, on the contrary, when it is 0.1186 or more, tan δ increases remarkably which is not preferred.

Further, in this invention, for obtaining suitable dielectric characteristics, it is preferred to incorporate Ta₂O₅ and/or NiO as the auxiliary component. Tan δ increases when the content of Ta₂O₅ is excessively high, so that the weight ratio e of Ta₂O₅ relative to the basic component is preferably: 0<e<0.05. Further, since tan δ increases when the content of NiO is excessively high, the weight ratio f of NiO relative to the basic component is preferably: 0<f<0.05. Particularly, by the combined use of Ta₂O₅ and NiO, scattering of the characteristics can be decreased and a dielectric ceramic composition for high frequency wave having further smaller tan δ can be obtained.

An example of a suitable process for producing a dielectric ceramic composition for high frequency wave according to this invention is shown below. Starting materials comprising aluminum oxide, zirconium oxide, titanium oxide and tin oxide, as well as tantalum oxide and nickel oxide as the auxiliary component are wet-mixed each by a predetermined amount together with a water and a solvent such as alcohol. Successively, after removing water and alcohol, they were pulverized. Successively, an organic binder such as polyvinyl alcohol is mixed to the thus obtained powder into a homogeneous state, which was dried, pulverized and press molded (at a pressure of about 100 to 1000 kg/cm²). The dielectric ceramic composition represented by the compositional formula described previously can be obtained by firing the resultant molding product at 1400 to 1600° C. in an oxygen-containing gas atmosphere such as air.

The thus obtained dielectric ceramic composition can be utilized as the material for dielectric resonator, dielectric substrate and laminate devices by being fabricated into an appropriate shape and size, or sheeted by a doctor blade method or laminated with a sheet and an electrode.

As the starting materials for aluminum, zirconium, titanium, tin, tantalum and nickel, there can be used Al₂O₃, ZrO₂, TiO₂, SnO₂, Ta₂O₅, and NiO, as well as nitrate, carbonate, hydroxide, chloride and organic metal compounds, which are converted into oxides upon firing.

EXAMPLE 1

A starting material powder comprising 0.6762 mol of $Al_2O_3$, 0.0810 mol of $ZrO_2$, 0.1781 mol of $TiO_2$ and 0.0648 mol of $SnO_2$ as the main component and $Ta_2O_5$ at a weight ratio of 0.02 to the basic component as the auxiliary component and NiO at a weight ratio of 0.01 relative to the basic component as the auxiliary component were placed together with ethanol and $ZrO_2$ balls in a ball mill, and wet mixed for 24 hours. After removing the solvent from the solution, they were pulverized. Successively, after adding an appropriate amount of a polyvinyl alcohol solution to the pulverizates and drying, they were molded into a pellet of 11 mm diameter and 6 mm thickness and fired in an air atmosphere at 1525° C. for 4 hours.

After fabricating the ceramic composition of Example 1 thus obtained into a size of 9.5 mm diameter and 4 mm thickness, it was measured by a dielectric resonance method to determine tan δ at a resonance frequency of 8 to 10 GHz, specific dielectric constant $\epsilon_r$, and temperature coefficient $\tau_f$ at the resonance frequency. The results are shown in Table 2. As seen in Table 2, preferable results were obtained like that specific dielectric constant $\epsilon_r$ is about 10–20, dielectric loss tan δ at a resonance frequency of 8 to 10 GHz is very small such as $2.8 \times 10^{-5}$, and absolute value of temperature coefficient $\tau_f$ at the resonance frequency is about 20.

When X-ray diffractiometry was conducted for the resultant dielectric ceramic composition, it has been found that $\alpha$-$Al_2O_3$ and $Zr_{0.75}Ti_{0.75}Sn_{0.5}O_4$ were mainly formed. FIG. 1 shows the X-ray diffraction chart.

EXAMPLES 2 TO 5

$Al_2O_3$, $ZrO_2$, $TiO_2$ and $SnO_2$ as the basic component and $Ta_2O_5$ and NiO as the auxiliary component were mixed at the ratio shown in Table 1 below, molded under the same conditions as in Example 1, and fired in air at 1525° C. for 4 hours to prepare dielectric ceramics. The characteristics of the resulting ceramics were evaluated by the same method as in Example 1. The results are shown in Table 2.

EXAMPLES 6a TO 6g $Al_2O_3$, $ZrO_2$, $TiO_2$ and $SnO_2$ as the basic component and $Ta_2O_5$ and NiO as the auxiliary component were mixed at the ratio shown in Table 1 below, molded under the same conditions as in Example 1, and fired in air at the temperature listed in Table 2 for 4 hours to prepare dielectric ceramics. The characteristics of the resulting ceramics were evaluated by the same method as in Example 1. The results are shown in Table 2. As seen from Table 2, dielectric loss tan δ is small and less scattering against firing temperature change, so that this dielectric ceramics is easy for the production.

EXAMPLES 7 TO 11

$Al_2O_3$, $ZrO_2$, $TiO_2$ and $SnO_2$ as the basic component were mixed without the auxiliary component at the ratio shown in Table 1 below, molded under the same conditions as in Example 1, and fired in air at 1525° C. for 4 hours to prepare dielectric ceramics. The characteristics of the resulting ceramics were evaluated by the same method as in Example 1. The results are shown in Table 2.

COMPARATIVE EXAMPLES 1 TO 2

$Al_2O_3$, $ZrO_2$, $TiO_2$ and $SnO_2$ as the basic component and $Ta_2O_5$ and NiO as the auxiliary component were mixed at the ratio shown in Table 1 below, molded, and fired in air at the temperature listed in Table 2 for 4 hours to prepare dielectric ceramics. The characteristics of the resulting ceramics were evaluated by the same method as in Example 1. The results are shown in Table 2. Dielectric loss tan δ at a resonance frequency of 8 to 10 GHz or absolute value of temperature coefficient $\tau_f$ at the resonance frequency is large when the composition is out of the range of this invention.

COMPARATIVE EXAMPLES 3a TO 3e $Al_2O_3$, $TiO_2$ and $SnO_2$ without $ZrO_2$ as the basic component and $Ta_2O_5$ and NiO as the auxiliary component were mixed at the ratio shown in Table 1 below, molded under the same conditions as in Example 1, and fired in air at the temperature listed in Table 2 for 4 hours to prepare dielectric ceramics. The characteristics of the resulting ceramics were evaluated by the same method as in Example 1. The results are shown in Table 2. As seen from Table 2, dielectric loss tan δ scatters much against firing temperature change, so that this dielectric ceramics is difficult for the production.

TABLE 1

| | Main component (molar ratio) | | | | Auxiliary component (wt %) | |
|---|---|---|---|---|---|---|
| | $Al_2O_3$ | $ZrO_2$ | $TiO_2$ | $SnO_2$ | $Ta_2O_5$ | NiO |
| Example 1 | 0.6762 | 0.0810 | 0.1781 | 0.0648 | 2 | 1 |
| Example 2 | 0.6222 | 0.0945 | 0.2078 | 0.0756 | 2 | 1 |
| Example 3 | 0.7316 | 0.0671 | 0.1476 | 0.0537 | 2 | 1 |
| Example 4 | 0.8111 | 0.0094 | 0.0945 | 0.0850 | 2 | 1 |
| Example 5 | 0.8446 | 0.0078 | 0.0777 | 0.0699 | 2 | 1 |
| Example 6 | 0.7778 | 0.0111 | 0.1111 | 0.1000 | 2 | 1 |
| Example 7 | 0.6762 | 0.0810 | 0.1781 | 0.0648 | 0 | 0 |
| Example 8 | 0.6222 | 0.0945 | 0.2078 | 0.0756 | 0 | 0 |
| Example 9 | 0.7316 | 0.0671 | 0.1476 | 0.0537 | 0 | 0 |
| Example 10 | 0.7778 | 0.0111 | 0.1111 | 0.1000 | 0 | 0 |
| Example 11 | 0.8111 | 0.0094 | 0.0945 | 0.0850 | 0 | 0 |
| Comparative Example 1 | 0.4068 | 0.1483 | 0.3263 | 0.1186 | 2 | 1 |
| Comparative Example 2 | 0.9550 | 0.0022 | 0.0225 | 0.0203 | 2 | 1 |
| Comparative Example 3 | 0.7280 | 0.0000 | 0.1660 | 0.1060 | 2 | 1 |

TABLE 2

| | Dielectric characteristic | | | Firing |
|---|---|---|---|---|
| | $\epsilon_r$ | tan δ ($\times 10^{-5}$) | $\tau$ f(ppm/° C.) | Temperature |
| Example 1 | 14.6 | 2.8 | −20.2 | 1525° C. |
| Example 2 | 13.7 | 2.8 | −20.2 | 1525° C. |
| Example 3 | 15.3 | 4.1 | −25.5 | 1525° C. |
| Example 4 | 12.4 | 4.9 | −8.4 | 1525° C. |
| Example 5 | 12.0 | 5.1 | −26.7 | 1525° C. |
| Example 6a | 13.2 | 4.7 | −1.1 | 1450° C. |
| Example 6b | 13.2 | 4.3 | −1.9 | 1475° C. |
| Example 6c | 13.2 | 4.7 | −2.0 | 1500° C. |
| Example 6d | 13.2 | 4.8 | −2.2 | 1525° C. |
| Example 6e | 13.1 | 4.9 | −2.2 | 1550° C. |
| Example 6f | 13.1 | 4.4 | −2.0 | 1575° C. |
| Example 6g | 13.1 | 4.6 | −2.0 | 1600° C. |
| Example 7 | 14.0 | 4.1 | −22.4 | 1525° C. |
| Example 8 | 13.6 | 3.2 | −21.5 | 1525° C. |
| Example 9 | 14.9 | 4.1 | −27.2 | 1525° C. |
| Example 10 | 13.0 | 5.7 | −2.0 | 1525° C. |
| Example 11 | 12.2 | 6.3 | −9.5 | 1525° C. |
| Comparative Example 1 | 18.2 | 14.1 | −43.3 | 1500° C. |
| Comparative Example 2 | 10.1 | 2.8 | −49.4 | 1575° C. |

TABLE 2-continued

| | Dielectric characteristic | | | Firing |
| --- | --- | --- | --- | --- |
| | $\epsilon_r$ | tan δ (×10$^{-5}$) | τ f(ppm/° C.) | Temperature |
| Comparative Example 3a | 12.1 | 9.8 | −9.0 | 1450° C. |
| Comparative Example 3b | 12.9 | 7.4 | −9.0 | 1475° C. |
| Comparative Example 3c | 13.5 | 7.1 | −9.4 | 1500° C. |
| Comparative Example 3d | 13.5 | 6.9 | −10.4 | 1525° C. |
| Comparative Example 3e | 13.3 | 8.1 | −10.8 | 1550° C. |

What is claimed is:

1. A dielectric ceramic composition for high frequency wave having a composition comprising Al, Zr, Ti, Sn and O as a basic component and represented by the compositional formula:

$$a Al_2O_3\text{-}b ZrO_2\text{-}c TiO_2\text{-}d SnO_2$$

(in which $0.4068<a<0.9550$, $0<b<0.1483$, $0.0225<c<0.3263$, $0.0203<d<0.1186$ and $a+b+c+d+=1$).

2. The dielectric composition for high frequency wave according to claim 1, which contains $Ta_2O_5$ as an auxiliary component and the ratio e of $Ta_2O_5$ relative to said basic component is: $0<e<0.05$.

3. The dielectric composition for high frequency wave according to claim 2 which contains NiO as an auxiliary component and the ratio f of NiO relative to said basic component is: $0<f<0.005$.

4. The dielectric composition for high frequency wave according to claim 1 which contains NiO as an auxiliary component and the ratio f of NiO relative to said basic component is: $0<f<0.05$.

* * * * *